United States Patent [19]

Morooka

[11] 4,394,346
[45] Jul. 19, 1983

[54] WATER LEVEL GAUGE FOR A NUCLEAR REACTOR

[75] Inventor: Shinichi Morooka, Tokyo, Japan

[73] Assignee: Tokyo Shibaura Denki Kabushiki Kaisha, Kawasaki, Japan

[21] Appl. No.: 215,655

[22] Filed: Dec. 12, 1980

[30] Foreign Application Priority Data

Dec. 20, 1979 [JP] Japan .................... 54-175507[U]
Jan. 29, 1980 [JP] Japan ................ 55-8578[U]

[51] Int. Cl.³ .................... G01F 23/16; G21C 17/02
[52] U.S. Cl. ........................ 376/258; 73/299; 165/11 R; 165/47; 376/247
[58] Field of Search ............... 73/299, 328; 376/245, 376/247, 249, 250, 257, 258; 165/11 R

[56] References Cited

U.S. PATENT DOCUMENTS

| | | | |
|---|---|---|---|
| 3,031,887 | 5/1962 | Weisend | 73/299 X |
| 3,250,123 | 5/1966 | Clayton | 73/328 X |
| 3,898,467 | 8/1975 | Schukei et al. | 376/245 X |
| 3,969,942 | 7/1976 | Hope et al. | 73/302 |
| 3,979,958 | 9/1976 | Janssen et al. | 73/290 R |
| 4,216,821 | 8/1980 | Robin | 376/250 X |

FOREIGN PATENT DOCUMENTS 34-10745 6/1955 Japan .

OTHER PUBLICATIONS

Publication JSME Handbook for Mechanical Engineering Chap. 6, Sect. 9.2.2.

*Primary Examiner*—Daniel M. Yasich
*Attorney, Agent, or Firm*—Oblon, Fisher, Spivak, McClelland & Maier

[57] ABSTRACT

A water level gauge for a nuclear reactor includes heat conduction means for absorbing and conducting heat to the outside of the drywell, the heat being supplied to reference water head water inside a reference water head tube defining a reference water level inside a reference water level container, and to water inside a lower part pressure pipe connecting a nuclear reactor pressure vessel with a differential pressure detector. The water level gauge further includes heat exchanger for removing the heat. With this device, the water level of the nuclear reactor may be correctly detected even in the case of leakage accident of the coolant of the nuclear reactor.

5 Claims, 3 Drawing Figures

WATER LEVEL GAUGE FOR A NUCLEAR REACTOR

The present invention relates to a water level gauge for a nuclear reactor.

BACKGROUND OF THE INVENTION

A water level gauge is included in the pressure vessel of a nuclear reactor for measuring the water level therein. The output of the water level gauge is supplied to various control machinery and equipment such as the nuclear reactor protection system, the water level control machinery and equipment, and the water supply control system for maintaining the safety of the nuclear reactor. It is therefore required that the water level gauge indicates correct water level signals even in the case of a nuclear reactor accident.

The principle of the water level gauge of a conventional nuclear reactor is such that a differential pressure is measured reflecting a difference in hydrostatic pressure between the water head at the measuring point of the pressure vessel and a reference water head in a reference water level container communicating with the upper part of the pressure vessel by an upper part pressure tube. The water level is obtained by the following equation:

$$h = \frac{H(\rho_o - \rho_g) - \Delta P}{\rho_l - \rho_g}$$

where $h$ is the true water level inside the pressure vessel, $\rho_g$ is the density of the vapor inside the pressure vessel, $\rho_l$ is the density of the water inside the pressure vessel, $H$ is the height of the reference water head, and $\rho_o$ is the density of the reference water head water.

However, the conventional water level gauge presents the following problems. During the normal operation of a nuclear reactor, the vapor inside the nuclear reactor is introduced from the upper part pressure tube to the inside of the reference water level container and is condensed therein so that the temperature of the reference water head water rises above 100° C. to a depth of about 100 mm below the reference water level. Then, the density $\rho_o$ of the reference water head water is locally varied, so that measurements of the water level become incorrect and unstable. Further, in the case of leakage accident of the coolant due to a break in the main vapor tube of the nuclear reactor, an abrupt loss of pressure inside the pressure vessel results in boiling under reduced pressure of the water inside the reference water level container. Since the temperature inside the drywell of the housing reaches above about 170° C. due to the leaked coolant, the reference water head water and the water inside the lower part pressure tube are boiled by this heat. Due to this, the output of the differential pressure detector for detecting the differential pressure is abnormally oscillated so that an erroneous signal is supplied to various pieces of control machinery and equipment.

SUMMARY OF THE INVENTION

It is, therefore, the primary object of the present invention to provide a water level gauge which prevents boiling of the reference water head water and the water inside the lower part pressure tube so that the water level of the nuclear reactor may be measured in a stable manner even in the case of leakage accident of the coolant or the like.

In order to accomplish the above and other objects, the present invention provides a water level gauge for a nuclear reactor, comprising heat conduction means for absorbing the heat supplied to the water inside the reference water head tube and the lower part pressure tube and for conducting it to the outside of the drywell, and a heat exchanger for removing the heat conducted to the outside of the drywell by the heat conducting means. When the heat exchanging capacity of the heat exchanger is controlled, the water temperature inside the reference water head tube and the lower part pressure tube may be controlled at less than 100° C. constantly.

This invention can be more fully understood from the following detailed description when taken in conjunction with the accompanying drawings, in which:

DETAILED DESCRIPTION OF THE PREFERRED EMBODIMENTS

Figure 1:
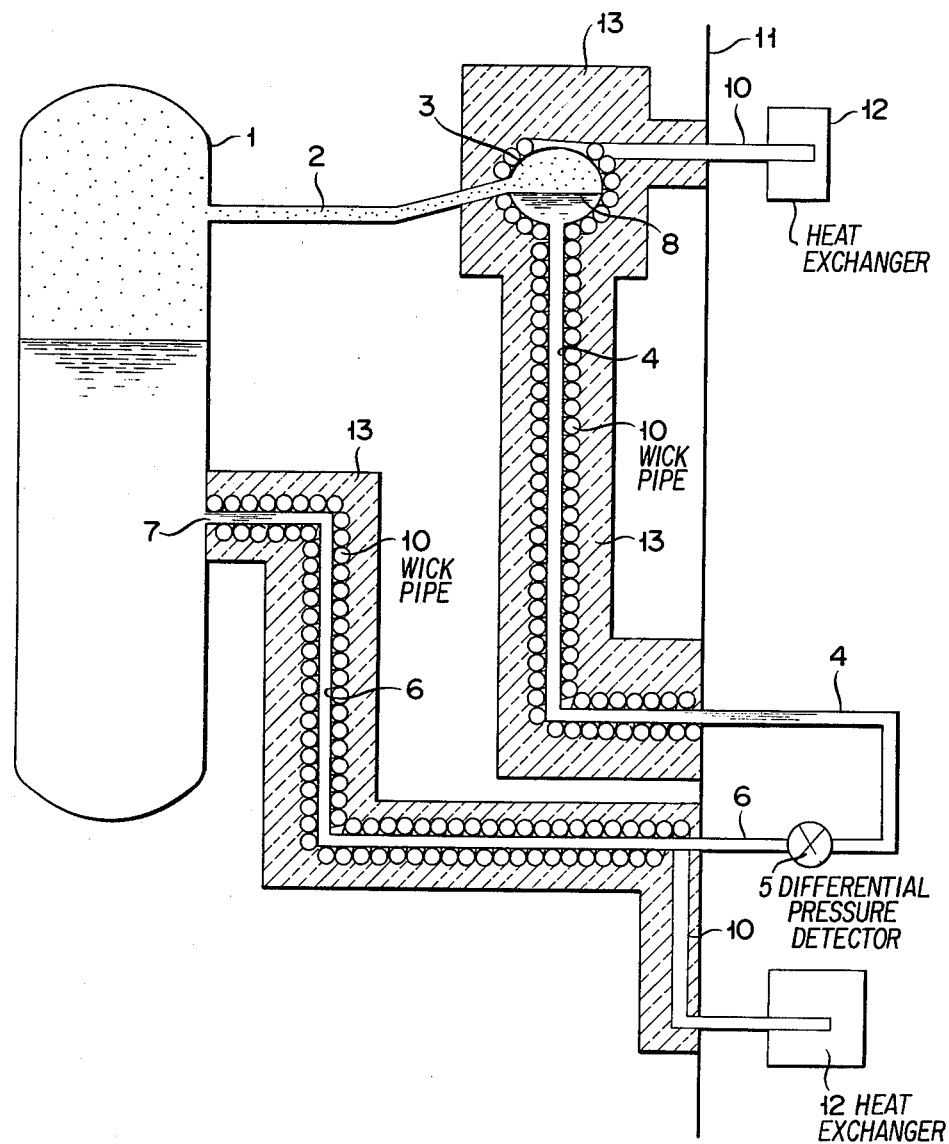
FIG. 1 is a sectional view illustrating one embodiment of a fluidic water level gauge for a nuclear reactor of the present invention wherein heat pipes are used as the heat conduction means.

In the embodiment shown in FIG. 1, an upper part of a liquid level gauge which comprises a pressure tube 2 extends from the upper part of a nuclear reactor pressure vessel 1 and communicates with the fluids in the pressure vessel and in a reference water level container 3. The lower part of the reference water level container 3 communicates with one inlet of a differential pressure detector 5 through a reference water head tube 4. The differential pressure detector 5 communicates with a predetermined measuring point 7 of the nuclear reactor pressure vessel 1 through a lower part pressure tube 6 inlet. The lower part pressure tube 6 is filled with a coolant such as water. The reference water head tube 4 is filled with the reference water head water, and the reference water head water defines a reference water level 8 inside the reference water level container 3. The vapor inside the nuclear reactor pressure vessel 1 flows through the upper part pressure tube 2 to the reference water level container 3. Heat pipes 10 are wound densely around the reference water level container 3, the reference water head tube 4 and the lower part pressure tube 6. At least one end of the heat pipe 10 is extended to the outside of a housing 11 and is inserted in heat exchangers 12. The heat pipe 10 comprises a metal pipe of a material such as stainless steel, a porous material called a wick which is laminated on the inner wall of the metal pipe, and a heat conducting material such as water or Freon which is impregnated in the wick. The wick may comprise, for example, sintered metal, a screen mesh, fiber and so on. The heat pipes 10 are covered with a general heat insulating material 13 such as pearlite or glass wool.

When the drywell atmosphere inside the housing 11 is raised to a high temperature due to leakage of the coolant or the like, the heat which has not been blocked by the heat insulating material 13 reaches the heat pipe 10 and evaporates the heat conducting material therein. The evaporated heat conducting material is transferred to the heat exchanger 12 and releases heat. The material is thus returned to its liquid phase and is displaced inside the wick by capillary action. Due to this function of the heat pipe, the water inside the reference water level container 3, the reference water head water inside the reference water head tube 4, and the water inside the lower part pressure tube 6 may be cooled and prevented from boiling so that correct measurements of the water level are possible.

Figure 2:
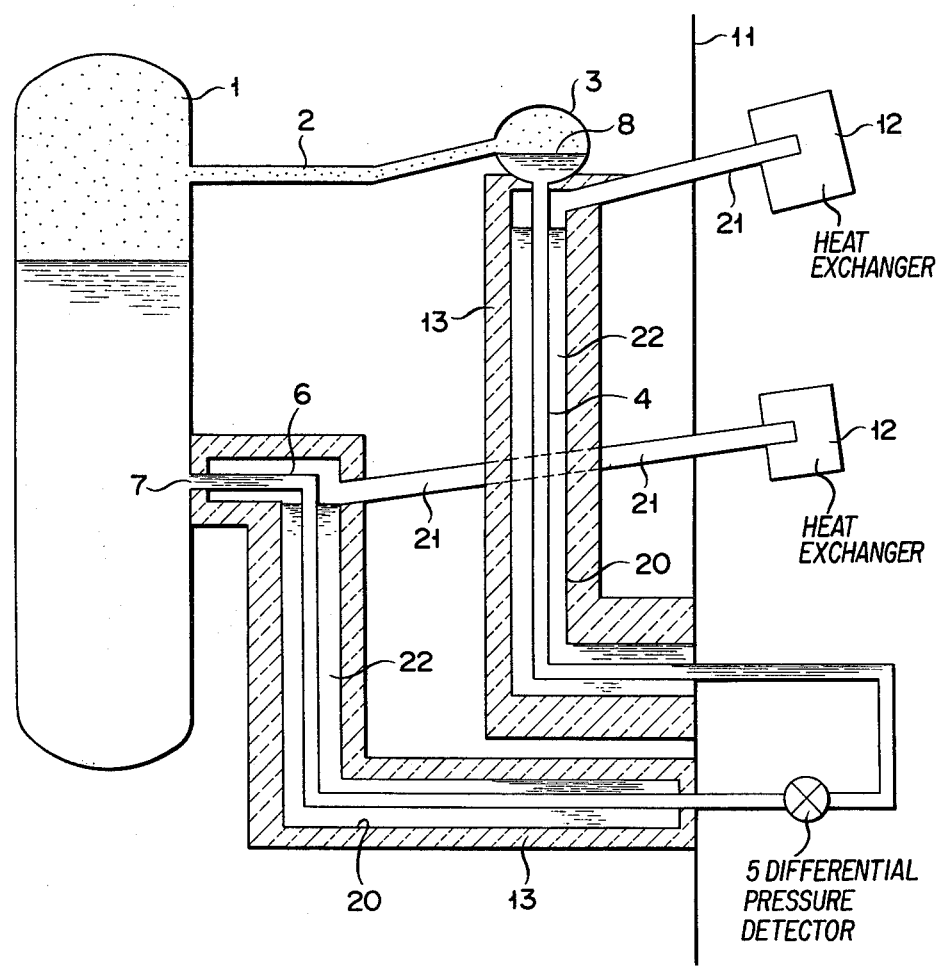
FIG. 2 is a sectional view illustrating another embodiment of the water level gauge of the present invention wherein thermosiphons are used as the heat conduction means.

FIG. 2 shows a second embodiment in which thermosiphons are used in place of the heat pipe of FIG. 1 as the heat conduction means, and the other parts are the same as the embodiment shown in FIG. 1. In this embodiment, sealed heat transfer pipes such as thermosiphon tubes 20 of sealed structure are substantially coaxially arranged around the reference water head tube 4 and the lower part pressure tube 6. Upwardly slanted tubes 21 inserted in heat exchangers 12 outside the housing 11 are disposed at the upper ends of the thermosiphon tubes 20. Inside the thermosiphon tubes 20, that is, in the space between the thermosiphon tubes 20 and the reference water head tube 4 and the lower part pressure tube 6, is sealed a suitable amount of working fluid 22 such as water or freon, and the noncondensable gases such as air are completely removed. The thermosiphon tubes 20 are covered with the general heat insulating material 13. Although the thermosiphon tubes 20 do not cover the reference water level container 3 in the embodiment of FIG. 2, better effects may be obtained if they do cover the reference water level container 3.

When the drywell atmosphere is raised to a high temperature due to leakage of the coolant or the like, the heat which is not blocked by the heat insulating material 13 is transmitted to the working fluid 22 inside the thermosiphon tubes 20 and evaporates it. The vapor of the working fluid 22 passes through the slanted tubes 21 and reaches the heat exchangers 12 disposed outside the housing 11. The vapor is then deprived of the heat and condensed on the inner walls of the slanted tubes 21. The condensed working fluid 22 is returned by the slanted tubes 21 to the thermosiphon tubes 20 under gravity. In this manner, the reference water head water and the water inside the lower part pressure tube are cooled and do not boil, so that correct and stable measurements of the water level may be assured.

Figure 3:
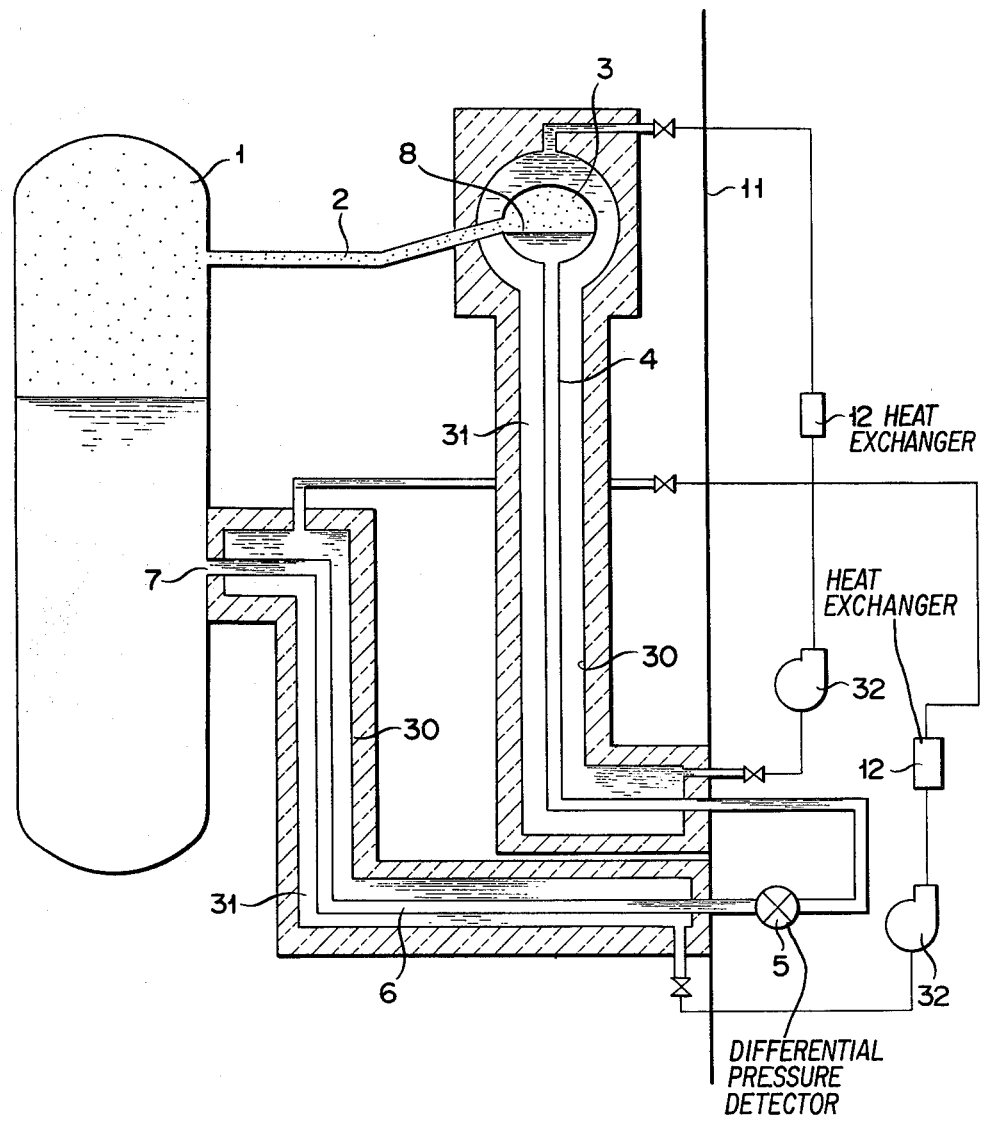
FIG. 3 is a sectional view of still another embodiment of the water level gauge of the present invention wherein coolant circulators are used as the heat conduction means.

FIG. 3 shows a third embodiment of the present invention in which cooling water circulators are used in place of the heat pipes of FIG. 1 as the heat conduction means, and the other parts are the same as in the embodiment shown in FIG. 1. In this embodiment, casings 30 cover the reference water level container 3, the reference water head tube 4 and the lower part pressure tube 6. Cooling water 31 is forcibly circulated inside the casings 30 by pumps 32. Heat exchangers 12 are disposed at locations before the cooling water 31 enters the pumps 32 for adjusting the water temperature of the cooling water. The outside surfaces of the casings 30 are covered with the general heat insulating material 13.

Heat not blocked by the heat insulating material 13 is passed by the circulating cooling water to the heat exchangers 12 outside the housing 11. The cooling water is then deprived of the heat and is returned as cool water. In this manner, the reference water head water and the water inside the lower part pressure tube 6 are constantly cooled and do not boil.

According to the present invention, the water inside the reference water level container, the reference water head water inside the reference water head tube and the water inside the lower part pressure tube are cooled and heat-insulated so that the water temperature may be controlled to be less than 100° C. Even in the case of leakage accident of the nuclear reactor coolant due to a break in the main vapor tube, the reference water head water and so on does not boil, regardless of the abrupt reduction in pressure in the pressure vessel and the abrupt temperature rise of the dry well atmosphere. With a water level gauge of the present invention, the water level of the nuclear reactor may be constantly monitored.

What is claimed as new and desired to be secured by Letters Patent of the United States is:

1. A water level gauge for a nuclear reactor having a reference water level container communicating with a fluid in the upper part of a nuclear reactor pressure vessel through an upper part pressure tube, a differential pressure detector with two inlets for detecting a differential pressure between the reference water level in the reference water level container and the water level inside the nuclear reactor pressure vessel, a reference water head tube connecting one of said two inlets of the differential pressure detector with the reference water level container, and a lower part pressure tube connecting the other inlet of the differential pressure detector with a predetermined measuring point of part of the nuclear reactor pressure vessel, characterized by further comprising heat conduction means for absorbing heat from the reference water head water inside said reference water head tube and from the water inside said lower part pressure tube and for conducting the heat to the outside of a housing of the nuclear reactor pressure vessel, and a heat exchanger for removing the heat conducted to the outside of the housing by said heat conduction means.

2. A water level gauge according to claim 1, wherein said heat conduction means are covered with a heat insulating material.

3. A water level gauge according to claim 1 or 2, wherein said heat conduction means are heat pipes wound around said reference water head tube and said lower part pressure tube, said heat pipes comprising metal pipes, a porous material laminated on the inner walls of said matal pipes and a heat conducting material impregnated in said porous material.

4. A water level gauge according to claim 1 or 2, wherein said heat conduction means comprise sealed heat transfer pipes which are coaxially arranged around said reference water head tube and said lower part pressure tube and in which a working fluid is sealed, and slanted tubes which open from the upper parts of said thermosiphon tubes and reach said heat exchangers at an upward slant.

5. A water level gauge according to claim 1 or 2, wherein said heat conduction means comprise casings covering said reference water head tube and said lower part pressure tube, and cooling water forcibly circulated within said casings.

* * * * *